United States Patent
Lee et al.

(10) Patent No.: US 8,428,169 B1
(45) Date of Patent: Apr. 23, 2013

(54) MIMO SOFT DEMODULATION USING HARD-DECISION CANDIDATE SELECTION

(75) Inventors: Jungwon Lee, Cupertino, CA (US);
Jiwoong Choi, Sunnyvale, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 650 days.

(21) Appl. No.: 12/510,037

(22) Filed: Jul. 27, 2009

Related U.S. Application Data (60) Provisional application No. 61/084,807, filed on Jul. 30, 2008.

(51) Int. Cl.
*H04B 7/02* (2006.01)

(52) U.S. Cl.
USPC ............ 375/267; 375/260; 375/259; 375/262

(58) Field of Classification Search .................. 375/267, 375/260, 259, 262
See application file for complete search history.

(56) References Cited

U.S. PATENT DOCUMENTS

| | | | | |
|---|---|---|---|---|
| 2003/0112901 | A1* | 6/2003 | Gupta | 375/340 |
| 2008/0310556 | A1* | 12/2008 | Lee et al. | 375/340 |

* cited by examiner

*Primary Examiner* — Zewdu Kassa (57) ABSTRACT

Systems and methods for reconstructing digital information in a multiple-input receiver from signals transmitted by a multiple-output transmitter, in a multiple-input multiple-output (MIMO) communications channel are provided. A plurality of signal streams are obtained from a plurality of transmitted signals and a first candidate signal value is selected for each of the plurality of signal streams. A plurality of additional candidate signal values are also selected for each of the plurality of signal streams in response to selecting the first candidate signal value. A log-likelihood ratio (LLR) is computed from the plurality of signal streams based on all of the selected candidate signal values. Digital information may then be estimated based on the computed LLR.

20 Claims, 9 Drawing Sheets

MIMO SOFT DEMODULATION USING HARD-DECISION CANDIDATE SELECTION

CROSS-REFERENCE TO RELATED APPLICATION

This claims the benefit under 35 U.S.C. §119(e) of U.S. Provisional Application No. 61/084,807, filed Jul. 30, 2008, which is hereby incorporated herein by reference in its entirety.

BACKGROUND OF THE INVENTION

This disclosure relates generally to signal detection, and more particular to detecting signals received in a multiple-input multiple-output (MIMO) system with a soft demodulation scheme using hard-decision candidate selection.

With the continuing demand for higher-speed digital communications systems and higher-density digital storage systems, various techniques have been applied to increase the capacity of these systems. However, even with high-capacity communications and storage media, their respective bandwidths and densities are still limited. Therefore, MIMO systems are often used to fully exploit the capabilities of these systems. In particular, increasing the dimensions of these systems enables higher throughput and reliability, as more information can be conveyed without increasing the bandwidth of such systems.

However, the efficiency gained by MIMO systems comes at the expense of a complex receiver design. In particular, a MIMO receiver may obtain a plurality of signals from its multiple receiver inputs, where each signal includes information from each of the multiple transmitter outputs. From all of this jumbled information, a MIMO detector can attempt to recover the independent information transmitted from each of the various transmitter outputs. Thus, this information recovery process may require some tradeoff between receiver complexity and performance.

SUMMARY OF THE INVENTION

In accordance with an embodiment, a method of reconstructing digital information in a multiple-input receiver from signals transmitted by a multiple-output transmitter, in a multiple-input multiple-output (MIMO) communications channel is provided. A plurality of signal streams are obtained from a plurality of transmitted signals and a first candidate signal value is selected for each of the plurality of signal streams using a hard-decision demodulator. A plurality of additional candidate signal values are also selected for each of the plurality of signal streams in response to selecting the first candidate signal value. A log-likelihood ratio (LLR) is computed from the plurality of signal streams based on all of the selected candidate signal values using a soft-decision demodulator. Digital information may then be estimated based on the computed LLR.

In accordance with another embodiment, a system for reconstructing digital information in a multiple-input receiver from signals transmitted by a multiple-output transmitter, in a multiple-input multiple-output (MIMO) communications channel is provided. A plurality of antennas obtain a plurality of signal streams from a plurality of transmitted signals. A hard-decision demodulator selects a first candidate signal value for each of the plurality of signal streams. A demodulator selects a plurality of additional candidate signal values for each of the plurality of signal streams in response to the selection of the first candidate signal value by the hard-decision demodulator. A soft-decision demodulator computes a log-likelihood ratio (LLR) from the plurality of signal streams based on all of the selected candidate signal values. A decoder may then estimate digital information based on the computed LLR.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
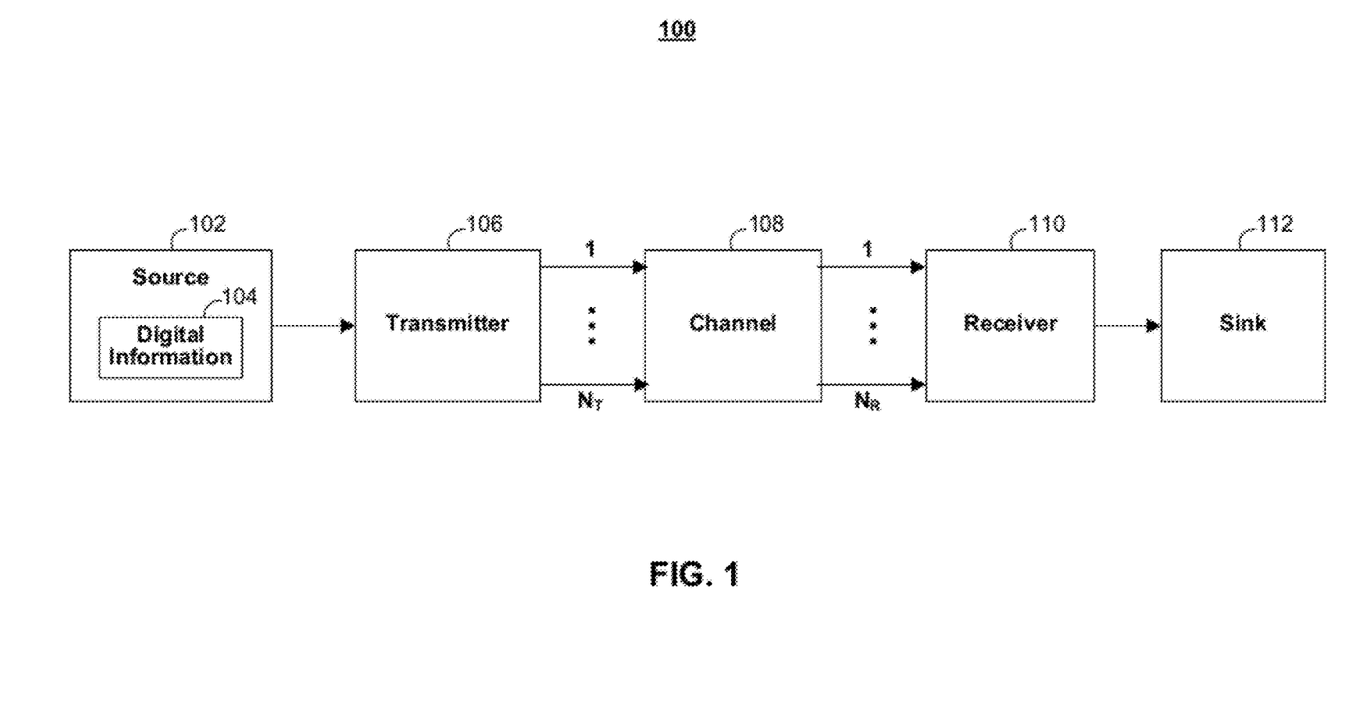
FIG. 1 shows a simplified illustrative multiple-input multiple-output (MIMO) digital communications or storage system.

FIG. 1 shows illustrative system 100 of a basic multiple-input multiple-output (MIMO) digital communications or storage system in accordance with an embodiment of the present invention. System 100 can include source 102, transmitter 106, receiver 110 and sink 112. System 100 can convey information, including digital information 104, from source 102 to sink 112 using transmitter 106 and receiver 110. Digital information 104 can represent any type of information to be conveyed to sink 112, such as a sampled/quantized version of an analog signal or binary information. Digital information 104 may be provided or generated by source 102. Source 102 can be any suitable type of digital information source including, but not limited to, a source encoder, a magnetic storage device (e.g., a hard disk), an electrical storage device (e.g., FLASH memory or RAM), or an optical storage device (e.g., a CD-ROM).

The information transferred from source 102 to sink 112 may travel through some transmission or playback medium. This medium is illustrated as channel 108 in FIG. 1. Channel 108 can represent any transmission or storage medium or media, and can alter information being transmitted through it. Thus, transmitter 106 and receiver 110 can be used to accurately transmit and receive information through channel 108. In particular, transmitter 106 preferably conveys digital information 102 in a manner appropriate for transmission through channel 108, and receiver 110 preferably interprets received information based on the properties of channel 108. Transmitter 106 can have a plurality of outputs for transmitting information and receiver 110 can have a plurality of inputs for receiving information.

For simplicity, the variable, $N_T$, will hereinafter represent the number of transmit antennas, and the variable, $N_R$, will hereinafter represent the number of receive antennas. Thus, transmitter 106 can have antennas $1, \ldots, N_T$, and receiver 110 can have antennas $1, \ldots, N_R$. Transmitter 106 can transmit S spatial streams using the transmit antennas to the receive antennas of receiver 110. The number of spatial streams, S, is less than or equal to the smaller of $N_T$ and $N_R$.

It should be understood that the enumeration of transmitter outputs (e.g., $1, \ldots, N_T$) and receiver inputs (e.g., $1, \ldots, N_R$) are for convenience only, and are not meant to suggest a particular ordering of the outputs. For example, it should not be assumed that the numbering is based on a spatial orientation of the various inputs/outputs, or that the enumeration suggests a relative priority of the various inputs/outputs.

The received signal model of a basic MIMO digital communications system (e.g., system 100) may be represented as:

$$y = Hx + z \qquad (EQ. 1)$$

where y is a received signal vector, H is an effective channel matrix (e.g., that includes any precoding operations at the transmitter), x is a transmitted data symbol vector and z is a circularly symmetric complex Gaussain noise vector with a covariance matrix of $R_z = \sigma_z^2 I$. In system 100, vectors y and z have $N_R$ elements corresponding to the number of receive antennas, vector x has S elements, corresponding to the number of transmitted data streams, and channel matrix H has $N_R \times S$ elements, where each element $h_{r,s}$ of channel matrix H represents the channel gain from stream s to receive antenna r.

Figure 2:
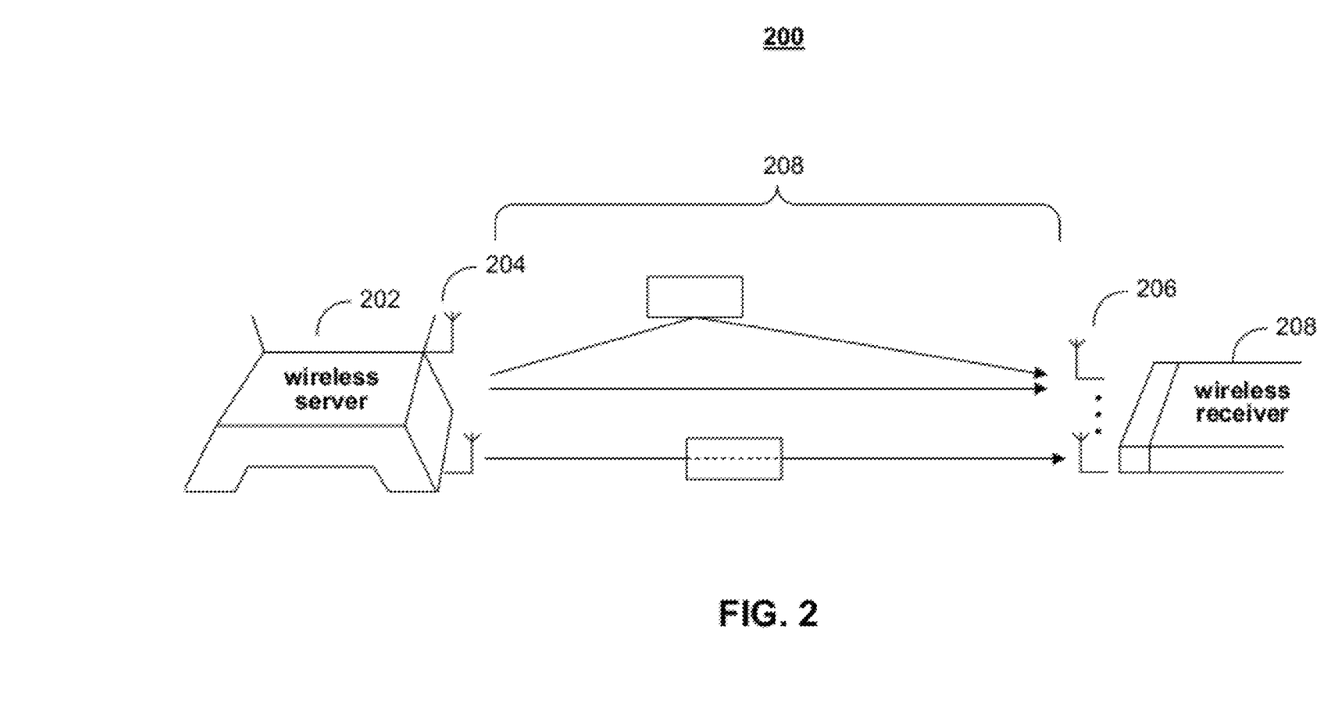
FIG. 2 shows an illustrative wireless communication system in accordance with an embodiment of FIG. 1.

Referring now to FIG. 2, illustrative wireless communication system 200 is shown in accordance with an embodiment of the present invention. Wireless system 200 may include any of the features and functionalities of the components in system 100 of FIG. 1. In this embodiment, wireless transmitter 202 may be a transmitter for broadcasting information wirelessly, such as a commercial gateway modem. Wireless transmitter 202 transmits information from a source using $N_T$ wireless antennas 204. Wireless receiver 206 can receive information wirelessly, and may be, for example, a commercial wireless computer adapter. Wireless receiver 206 can receive information transmitted from wireless transmitter 202 using $N_R$ receive antennas 206, and may receive this information from channel 208. Channel 208 may include the space between transmit antennas 204 and receive antennas 206, and may include any structures within the space that may obstruct and attenuate the transmitted signals. For example, channel 208 can alter the transmitted signals due to at least multipath fades and shadowing effects. The information may be transmitted over a single carrier signal or over multiple carrier signals. For example, wireless system 200 may be a Code Division Multiple Access (CDMA) system, a Wi-Fi system, a Worldwide Interoperability for Microwave Access (WiMax) system, a Long Term Evolution (LTE) system, or any other suitable MIMO system.

Figure 3:
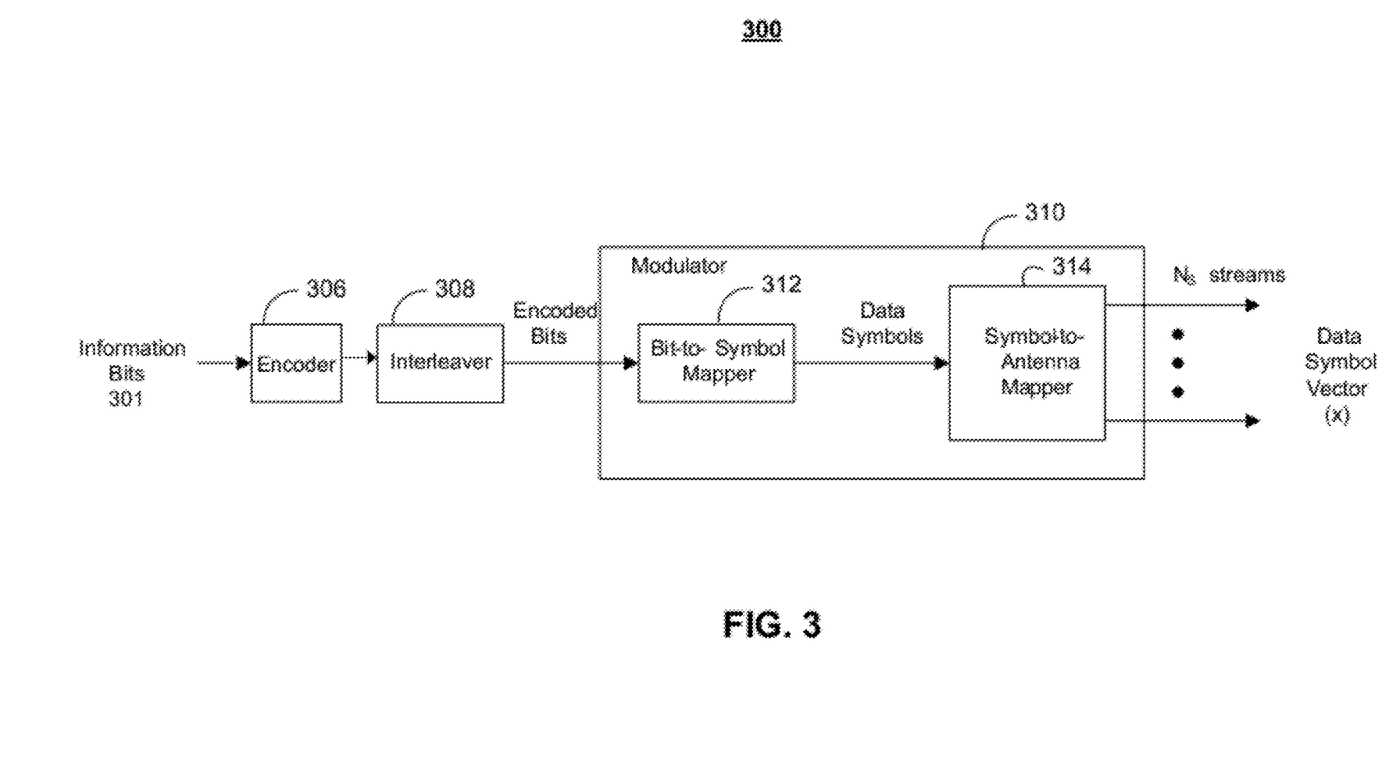
FIG. 3 shows an illustrative MIMO transmitter.

Referring now to FIG. 3, an illustrative block diagram is shown of transmitter 300 accordance with an embodiment of the present invention. Transmitter 300 may have any of the features and functionalities of transmitter 106 in FIG. 1. In some embodiments, transmitter 300 may be a wireless transmitter, such as those shown in FIG. 2. Transmitter 300 can include encoder 306, interleaver 308, and modulator 310. Encoder 306 may encode information bits 301 (e.g., digital information 104 of FIG. 1) based on any suitable error correcting or error detecting code. In some embodiments, encoder 306 may be a convolutional encoder, a Reed-Solomon encoder, or a CRC encoder. Encoder 306 may also implement an advanced encoding scheme such as convolutional turbo codes or low density parity check codes. Since encoder 306 may have a memory of m, each m consecutive bits in the encoded stream created by encoder 306 may depend on the value of the same information bits. In order to remove any adverse effects that may result from this dependency (e.g., the inability to reliably decode when burst errors are present), the encoded stream may also be interleaved by interleaver 308. In particular, interleaver 308 may change the order of the bits in the encoded stream to ensure that neighboring bits in the interleaved sequence are effectively independent of each other.

Transmitter 300 includes modulator 310 that includes bit-to-symbol mapper 312 and symbol-to-antenna mapper 314. Bit-to-symbol mapper 312 may be configured to convert the interleaved bits produced by interleaver 308 into symbols based on the size of a modulation scheme. Bit-to-symbol mapper 312 may use any suitable modulation scheme of any of a variety of sizes. For example, bit-to-symbol mapper 312 may utilize a quadrature amplitude modulation ("QAM") scheme (e.g., 4QAM, 16QAM, 32QAM) or a phase shift keying ("PSK") modulation scheme (e.g., QPSK, 16PSK, 32PSK). Symbol-to-antenna mapper 314 may then modulate the symbols into S streams to be transmitted by $N_T$ antennas. Collectively these streams are referred to as data signal vector x that consists of S data symbols.

Figure 4:
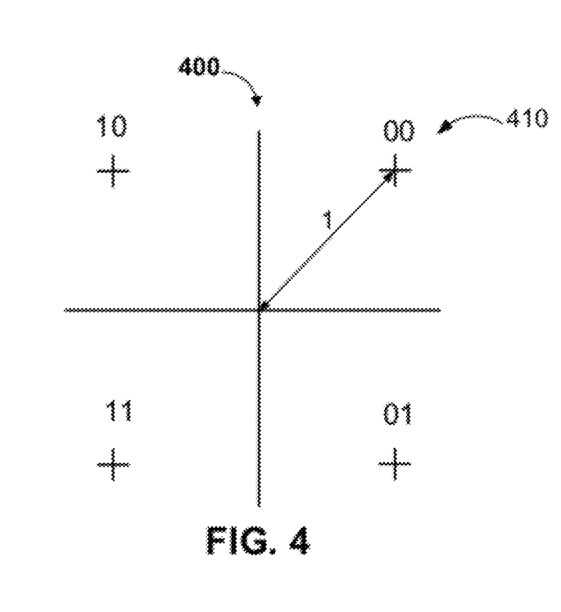
FIG. 4 shows an illustrative signal constellation set for a 4QAM/QPSK modulation scheme.
Figure 5:
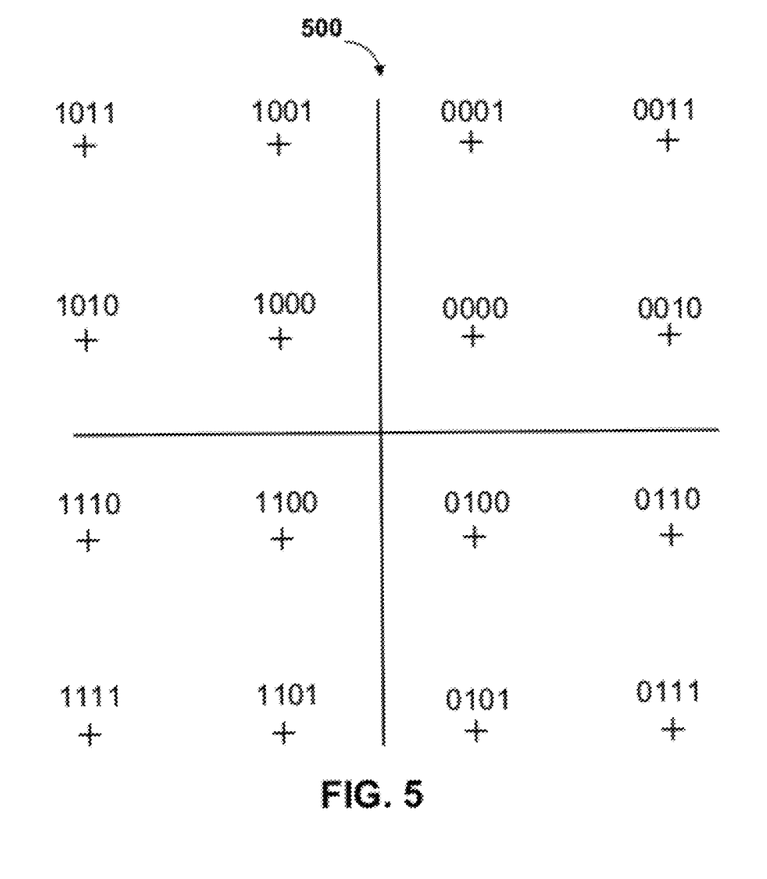
FIG. 5 shows an illustrative signal constellation set for a 16QAM modulation scheme.

The modulation scheme used by modulator 310 may be associated with a signal constellation set that defines the magnitude and phase of a carrier signal that is transmitted for each possible symbol value. For example, FIG. 4 shows an illustrative signal constellation set 400 for a 4QAM/QPSK modulation system, and FIG. 5 shows an illustrative signal constellation set 500 for a 16QAM modulation scheme. In these figures, the respective constellation sets are shown on a complex number plane, where each "+" represents a signal constellation point having a particular phase and magnitude. For example, referring to FIG. 4, signal constellation point 410 has a magnitude of one and a phase of +45 degrees. Thus, when that signal constellation point is selected for transmission, modulator 310 may produce a radio signal that has a magnitude of one and a phase of +45 degrees.

Each signal constellation point in signal constellation sets 400 is associated with a particular 2-bit symbol, and each signal constellation point in set 500 is associated with a particular 4-bit symbol. The symbols in these respective constellation sets may be assigned to particular signal constellation points based on a Gray code mapping. A Gray code mapping maps neighboring signal points in the modulation scheme to symbols that differ in only one bit. For example, in FIG. 4, the two signal points that correspond to symbols differing by two bits ("00" and "11") are not neighboring signal points. Gray code mapping therefore ensures that, even if a signal were mistaken for a neighboring signal point when decoded, the incorrectly decoded signal can be incorrect in only one bit.

Referring back to FIG. 3, modulator 310 can use any suitable one-dimensional or multi-dimensional modulation scheme, and therefore any suitable signal constellation set, for converting symbols to signals. For example, modulators 310 may modulate symbols according to the 16QAM modulation scheme illustrated in FIG. 5. In other embodiments, modulators 310 can modulate symbols based on phase shift keying (PSK), frequency shift keying (FSK), or any other suitable modulation scheme.

It should be understood that transmitter 300 of FIG. 3 is merely illustrative. In particular, any of the components of transmitter 300 may be modified, omitted, or rearranged, or any additional components may be added, without departing from the scope of the invention. Furthermore, any of the components may be combined into a component with combined functionality.

Figure 6:
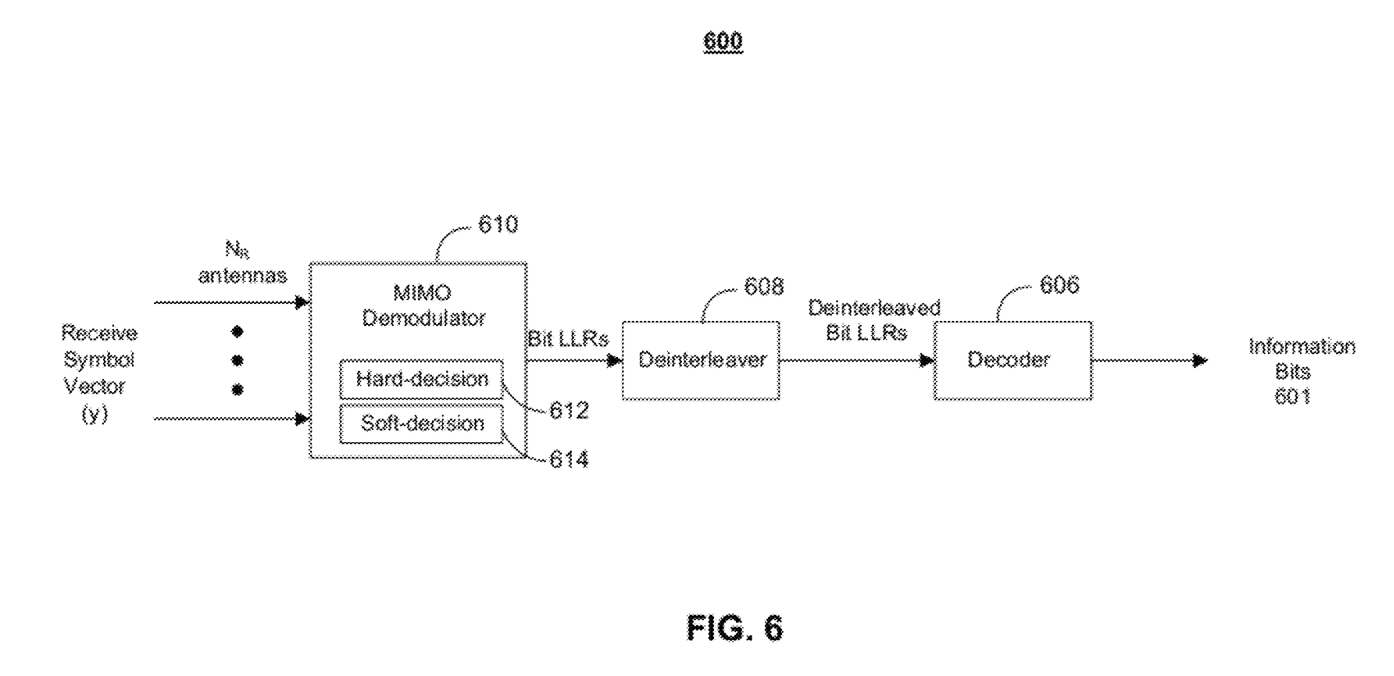
FIG. 6 shows an illustrative MIMO receiver including a soft-decision demodulator that uses hard-decision candidate selection.

Referring now to FIG. 6, an illustrative block diagram is shown of receiver 600 in accordance with an embodiment of the present invention. Receiver 600 may have any of the features and functionalities of receiver 110 in FIG. 1. In some embodiments, receiver 600 may be a wireless receiver, such as those shown in FIG. 2. Receiver 600 can receive a symbol vector y using $N_R$ receive antennas and obtain an estimate of the originally transmitted information (e.g., information bits of FIG. 3). To decode the receive signal vector, receiver 600 can include MIMO demodulator 610, deinterleaver 608, and decoder 606. Each of these receiver components may correspond to a transmitter component in transmitter 300 (FIG. 3) and may effectively undo the operation performed by the corresponding transmitter component. For example, MIMO demodulator 610 may correspond to modulator 310 that can demodulate/de-map receive signal vector y using at least the same modulation scheme and signal constellation set as that used by modulator 310. Deinterleaver 608 may correspond to interleaver 308 and may return the symbol order of the received data into its original order, e.g., the order expected by decoder 606. Decoder 606 may be a decoder that corresponds to encoder 306, and may perform decoding based on the same error correcting code as encoder 306. Thus, decoder 606 may produce estimate of the transmitted information bits 301. In some embodiments, decoder 606 may be a Viterbi decoder or a Turbo decoder. If receiver 600 successfully interprets receive signal vector y, information bits 601 may be the same digital sequence as information bits 301.

Referring to MIMO demodulator 610 of FIG. 6 in more detail, MIMO demodulator 610 may calculate soft information for each bit of information contained within the intended signal, for example, using soft-decision block 614. The soft information may be in the form of a log-likelihood ratio ("LLR") for each received bit of intended information. As described above, each data symbol vector x has S data signals:

$$x = [x_1 x_2 \ldots x_S]$$ (EQ. 2).

Each data symbol $x_s$ has W bits:

$$(b_{s,1}, \ldots, b_{s,W}) \Rightarrow x_x$$ (EQ. 3)

where $b_{s,n}$ represents the n-th bit in the s-th stream data symbols. M is the size of the constellation set for the selected modulation scheme (e.g., M=4 for a 4QAM/QPSK modulation scheme and M=16 for a 16QAM modulation scheme) and $M=2^W$. The LLR for each bit in data symbol vector x may be calculated according to EQ. 4:

$$LLR(b_{s,n}) = \log \frac{Pr\{b_{s,n} = 1\}}{Pr\{b_{s,n} = 0\}} \Rightarrow LLR(b_{s,n}) = \log \frac{Pr\{y \mid b_{s,n} = 1\}}{Pr\{y \mid b_{s,n} = 0\}}$$ (EQ. 4)

where $b_{s,n}$ is the transmitted bit of data symbol vector x contained within received signal vector y for which the LLR is being calculated. MIMO demodulator 610 can obtain a reliable log-likelihood ratio based on EQ. 4 by using accurate estimates of the channel information for the intended channel and any interference channels, as well as modulation information for these channels.

The log-likelihood ratio of EQ. 4 for a received signal vector y may be calculated based on the following equation:

$$LLR(b_{s,n}) = \log\left(\sum_{x \in X_{s,n}^{(1)}} \exp\left(-\frac{\|y - Hx\|^2}{\sigma_z^2}\right)\right) - \log\left(\sum_{x \in X_{s,n}^{(0)}} \exp\left(-\frac{\|y - Hx\|^2}{\sigma_z^2}\right)\right)$$ (EQ. 5)

where $x_{s,n}^{(b)}$ is the set of all possible data symbol vectors x with $b_{s,n}=b$. EQ. 5 represents a "true" soft-decision demodulation LLR calculation. In calculating this equation, the distance between y and Hx is calculated for every value of x. In other words, $\|y-Hx\|^2$ is calculated for $M^S$ different values of x. For example, for a 16QAM modulation scheme (i.e., M=16) with 4 different streams (i.e., S=4), there will be 65,536 distance calculations for each data symbol vectors x. Furthermore, these calculation may require exponential and logarithm operations that may be complicated to implement. While the LLR calculation of EQ. 5 will provide optimal performance within a soft-decision demodulator such as MIMO demodulator 610, the large number of calculations is high in complexity.

The soft-decision demodulation LLR computation based on EQ. 5 may be approximated as:

$$LLR(b_{s,n}) \approx \frac{1}{\sigma_z^2}\left[\min_{x \in X_{s,n}^{(0)}} \|y - Hx\|^2 - \min_{x \in X_{s,n}^{(1)}} \|y - Hx\|^2\right].$$ (EQ. 6)

In this LLR computation, the minimum of $\|y-Hx\|^2$ over the set $x_{s,n}^{(1)}$ and the minimum of $\|y-Hx\|^2$ over the set $x_{s,n}^{(0)}$ are separately found. The number of elements in each of these sets is $M^S/2$. The approximate soft-decision demodulation LLR computation of EQ. 6 may be easier to compute than the true soft demodulation LLR computation of EQ. 5 due to the absence of exponential and logarithm operations. While the performance of the approximate soft-decision demodulation LLR computation is near optimal, the complexity of this computation is still high.

The complexity of the soft-decision demodulation LLR computation may be further reduced according to the K-Best algorithm. This algorithm first calculates the squared distances $\|y-x_s h_s\|^2$ for all M possible choices of $x_S$ to determine the K choices of $x_S$ that yield the smallest distance. Then, for each of K $x_S$'s chosen in the past, K choices of $x_{S-1}$ are selected such that yield the smallest distance $\|y-x_s h_s - x_{s-1} h_{s-1}\|^2$. This algorithm is repeated for each of the S data symbols $x_s$, until all data symbols in data signal vector x are included in the square distance calculation and K candidate signals are selected for each of the S data symbols $x_S$. As a result $K^S$ candidate signals are selected as possible set of x. Then the LLR values may be computed by comparing the distances of the $K^S$ candidate values of x using:

$$LLR(b_{s,n}) \approx \frac{1}{\sigma_z^2}\left[\min_{x \in \overline{X}_{s,n}^{(0)}} \|y - Hx\|^2 - \min_{x \in \overline{X}_{s,n}^{(1)}} \|y - Hx\|^2\right].$$ (EQ. 7)

where $\overline{x}_{s,n}^{(0)} \subset x_{s,n}^{(0)}, \overline{x}_{s,n}^{(1)} \subset x_{s,n}^{(1)}$ and where the number of elements in $\overline{x}_{s,n}^{(0)}$ and $\overline{x}_{s,n}^{(1)}$ is equal to $K^S$ for s=1, ..., S and n=1, ... W. Thus EQ. 7 is the same as EQ. 6, except instead of comparing the squared distances for $M^S/2$ elements (EQ. 6) only $K^S$ squared distance are compared (EQ. 7). In other words, only K candidate signals are compared for each of the S data symbols $x_S$ instead of comparing all M candidate signals. Counting both the squared distance calculations used to determine the $K^S$ values of x and the squared distance calculations used to compute the LLR based on the determined $K^S$ values, there will be a total of $M(K^S-1)/(K-1)$ distance calculations. Continuing the example from above, if M=16, S=4, and K=5 there will only be 2,496 distance calculations for each data symbol vectors x. This K-Best algorithm provides good performance with only moderate complexity of computation.

One feature of the K-Best algorithm is that there may not be a candidate signal value K that corresponds to the bit value of 0 or 1 for every bit n, i.e., $|\bar{x}_s^{(0)}|=0$ or $|\bar{x}_s^{(1)}|=0$, where $|X|$ is the number of elements in X. A default value $L_F$ may be used in EQ. 7 when there is not a candidate signal value corresponding to a particular bit value.

In some embodiments, the selection of K candidate values may be performed more efficiently than in the K-Best algorithm. This process is referred to herein as hard-decision based candidate selection. This hard-decision based candidate selection may be performed, for example, using hard-decision block 612. Similar to the K-Best algorithm, the LLR for the n-th bit in the s-th stream is calculated by comparing the distance of K values of $x_s$, using:

$$LLR(b_{s,n}) \approx \frac{1}{\sigma_z^2} \left[ \min_{x \in \hat{x}_{s,n}^{(0)}} \|y - Hx\|^2 - \min_{x \in \hat{x}_{s,n}^{(1)}} \|y - Hx\|^2 \right]. \quad (EQ. 8)$$

where $\tilde{x}_{s,n}^{(0)} \subset x_{s,n}^{(0)}$, $\tilde{x}_{s,n}^{(1)} \subset x_{s,n}^{(1)}$ and in $\tilde{x}_{s,n}^{(0)}$ and $\tilde{x}_{s,n}^{(1)}$ is equal to $K^S$ for s=1, ..., S and n=1, ... W. According to this embodiment, a hard-decision candidate selection may be used to select K candidate signals in order to eliminate the need to perform intermediate squared distance calculations. Further, in order to avoid the use of a default value, the K candidate values may be selected such that $|\tilde{x}_s^{(0)}|$ and $|\tilde{x}_s^{(1)}| \geq 1$ for s=1, ..., S and n=1, ... W. Hence the situations where there may be no signals that corresponds to the bit value of 1 or 0 for the n-th bit may be eliminated. This condition implies that K 7 W+1.

Hard-decision based candidate selection for stream $x_s$ includes performing hard-decision demodulation to select the first candidate signal value and then performing candidate selection to select the remaining K-1 candidate signal values. A hard-decision demodulation technique may be used to map a received signal to the nearest signal values $\hat{x}_s$ of $x_s$.

For example, a hard-decision selection of $x_p$ ($\hat{x}_p$) can be obtained from a received signal using any conventional MIMO hard-decision demodulation techniques or detector, e.g., liner equalization (a zero-forcing (ZF) linear detector, minimum mean square error (MMSE) detector), nonlinear decision feedback equalization (DFE), ZF-DFE, MMSE-DFE, sphere decoding, or a serial interference canceller. Any other suitable hard-decision demodulation technique may also be used.

After a first candidate signal value is selected, the remaining K-1 candidate signal values may be selected. As described above, it is desirable to select candidate signal values that are close to $\hat{x}_p$ and such that there is at least one element $\tilde{x}_{p,n}^{(0)}$ and $\tilde{x}_{p,n}^{(1)}$ This process may be performed by obtaining the bit values of $\hat{x}_p$, i.e., $b'_{p,1} \ldots b'_{p,W}$. Then for each value of n from 1 to W, a candidate signal value of $x_p$ is selected that is closest to $\hat{x}_p$ among $x_p \in X_{p,n}^{1-b'_{p,n}}$. In other words, a candidate signal value $x_p$ may be selected by individually flipping each bit $\hat{x}_p$ and finding the closest signal value having that flipped bit. This may be illustrated more clearly with reference to FIGS. 7A-7D.

Figure 7A:
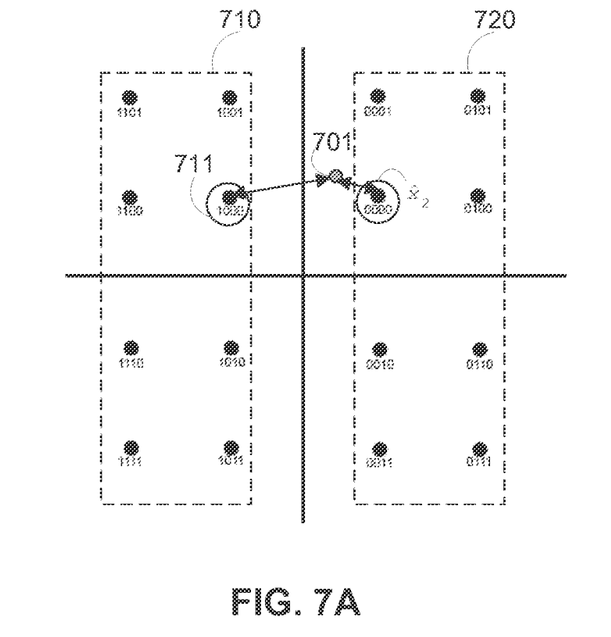
FIGS. 7A-7D graphically illustrate a process for selecting candidate constellation points using hard-decision demodulation.
Figure 7B:
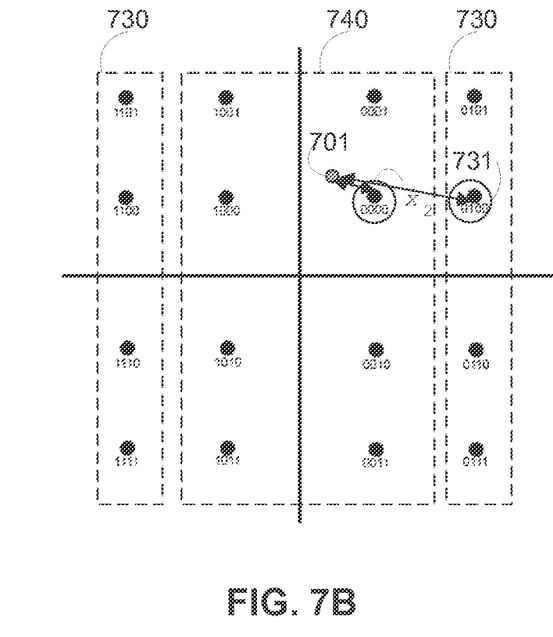
Figure 7C:
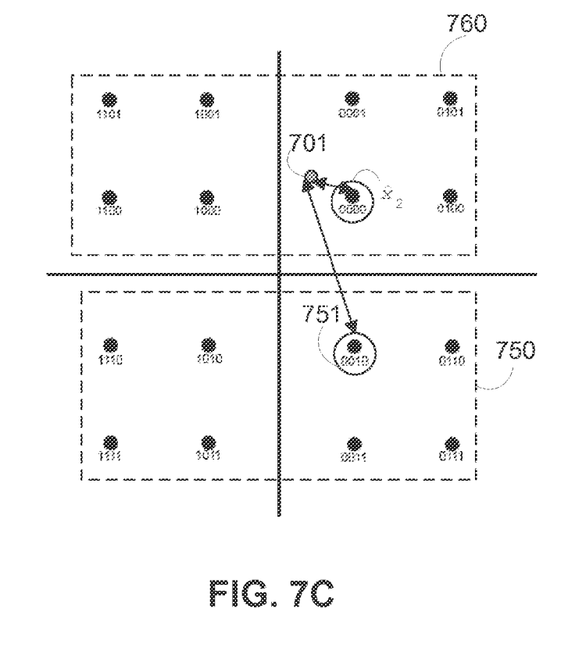
Figure 7D:
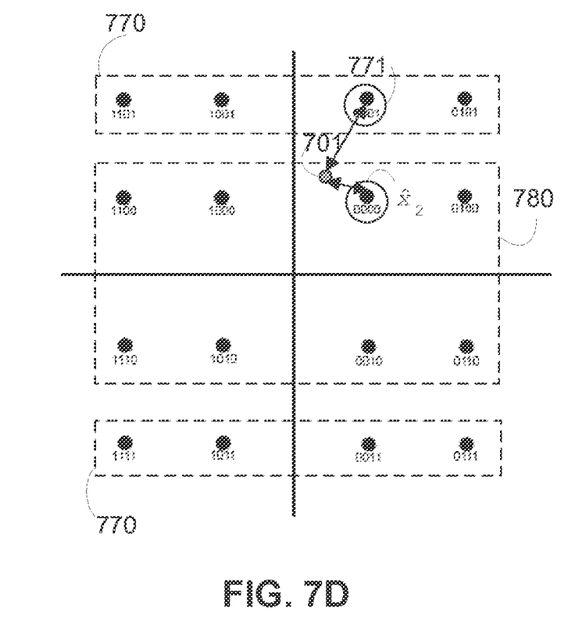

FIGS. 7A-7D graphically illustrate a process for hard-decision based candidate selection in a 16QAM modulation scheme (i.e., W=4) where K=5. First, received signal 701 may be mapped to the nearest constellation point $\hat{x}_2$ (0000) using any suitable hard-decision demodulation technique. Then for each bit in the signal, a candidate point may be selected by flipping that bit of constellation point $\hat{x}_2$ and locating the constellation point with the flipped bit that is closest to $\hat{x}_2$. This may be performed without any distance calculation by slicing or rounding to nearest symbol in the corresponding flipped bit group. In FIG. 7A, box 710 indicates the constellation points having a first bit equal to 1 and box 720 indicates the constellation points having a first bit equal to 0. This is possible by slicing, i.e., mapping the point 701 or $\hat{x}_2$ to the closest point in box 710 considering a decision boundary for 8 points in box 710. Constellation point 711 may be selected as a candidate signal value because it is the closest point to $\hat{x}_2$ having a first bit equal to 1. In FIG. 7B, box 730 indicates the constellation points having a second bit equal to 1 and box 740 indicates the constellation points having a second bit equal to 0. Constellation point 731 may be selected as a candidate signal value because it is the closest point to $\hat{x}_2$ having a second bit equal to 1. In FIG. 7C, box 750 indicates the constellation points having a third bit equal to 1 and box 760 indicates the constellation points having a third bit equal to 0. Constellation point 751 may be selected as a candidate signal value because it is the closest point to $\hat{x}_2$ having a third bit equal to 1. In FIG. 7D, box 770 indicates the constellation points having a fourth bit equal to 1 and box 780 indicates the constellation points having a fourth bit equal to 0. Constellation point 771 may be selected as a candidate signal value because it is the closest point to $\hat{x}_2$ having a fourth bit equal to 1. Thus, FIGS. 7A-7D show how 5 candidate values may be selected using the a hard-decision demodulation technique.

If there are additional candidate values to be selected (i.e., if K>W+1) these additional values may be selected based on their proximity to a point $X_P$ selected by the hard-decision demodulator. Alternatively or additionally these additional candidate values may be the next closest signal values among $x_p \in X_{p,n}^{1-b'_{p,n}}$ that were not previously selected. The selection of the K candidate values may be determined in response to receiving each signal. Alternatively the selection of the K candidate values may be stored in advance for any received signal. The K candidate values may be stored, for example, within a memory or look-up table within demodulator 610 (FIG. 6).

Figure 8:
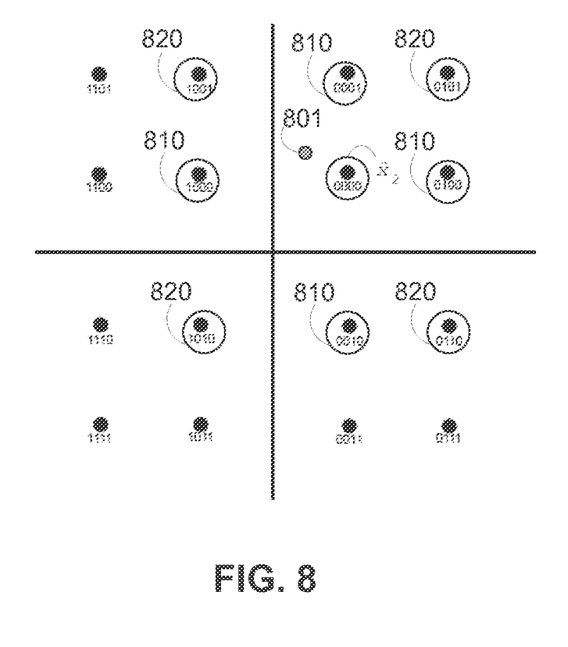
FIG. 8 graphically illustrates another process for selecting candidate constellation points using hard-decision demodulation.

FIG. 8 shows an illustrative diagram of the candidate values selection using a hard-decision demodulation technique with in a 16QAM modulation (W=4) scheme with K=9. The received signal is represented by point 801 and $\hat{x}_2$ is the nearest constellation point determined using any suitable hard-decision demodulation technique. Candidate points 810 are selected in the same manner as the candidate points described above with respect to FIGS. 7A-7D. Candidate points 820 are the additional candidate points that may be selected based on their proximity to $\hat{x}_2$.

After the hard-decision based candidate selection of the K candidate signal values for stream $x_s$ is performed, K candidate signal values may be selected for $x_{s-1}$, for each of the K selected values for $x_s$. The same step may be repeated for the remaining streams of x. Finally, after $K^S$ candidates are selected for received signal y, a LLR may be computed based on EQ. 8. The number K of candidate may be the same for all of the streams of x or may be chosen differently for each stream.

The complexity and performance of demodulation using the hard-decision based candidate selection depends on the number of candidate values K. As K increases, the performance of the demodulation improves, as well as the increased complexity. Thus, the value of K must be selected to balance performance and complexity. In the extreme, when K=M this demodulation technique will be the same as the demodulation technique described above with respect to EQ. 6. Demodulation using the hard-decision based candidate selection may have better performance than the K-Best algorithm because the hard-decision based candidate selection technique avoids the use of default values. Furthermore the hard-decision based candidate selection technique may have lower complexity than the K-Best algorithm because no intermediate distance calculation are used to select the K candidate values.

The basic MIMO digital communications system model described above with respect to EQ. 1, may be modified for use in conjunction with QR decomposition of channel matrix H. That is, channel matrix H may be decomposed into an orthogonal, unitary matrix Q and an upper triangular matrix R, where H=QR. The signal model of EQ. 1 may therefore be rewritten as:

$$\tilde{y}=Q^*y=Q^*Hx+Q^*z=Rx+\tilde{z} \quad (EQ. 9)$$

EQ. 9 has the same form as EQ. 1, except that the R matrix has the property that it is an upper triangular matrix. The upper triangular matrix R may lower the complexity of MIMO demodulation since the computations at the elements of zero in R are not required. Similar to QR decomposition technique, other linear processing techniques can be applied to y.

The complexity of demodulation using the hard-decision based candidate selection may be reduced further by simplifying the demodulation of the final stream using a dimension reduction scheme. Illustrative dimension reduction schemes are described in application Ser. No. 12/406,587, filed Mar. 18, 2009 and application Ser. No. 12/469,382, filed May 20, 2009, both of these applications are hereby incorporated by reference herein in their entirety.

The foregoing describes systems and methods for MIMO soft demodulation on using hard-decision based candidate selection. Those skilled in the art will appreciate that the invention can be practiced by other than the described embodiments, which are presented for the purpose of illustration rather than of limitation.

What is claimed is:

1. A method of reconstructing digital information in a multiple-input receiver from signals transmitted by a multiple-output transmitter, in a multiple-input multiple-output (MIMO) communications channel, the method comprising:
    obtaining a plurality of signal streams from a plurality of transmitted signals, wherein the plurality of signal streams includes a first signal stream and a second signal stream;
    selecting a first candidate signal value for the first signal stream and a second candidate signal value for the second signal stream using a hard-decision demodulator;
    selecting a first plurality of additional candidate signal values for the first signal stream based on the first candidate signal value and a second plurality of additional candidate signal values for the second signal stream based on the second candidate signal value;
    computing a first and a second log-likelihood ratio (LLR) from the plurality of signal streams, wherein the first LLR is computed based on the first candidate signal and the first plurality of additional candidate signal values, and the second LLR is computed based on the second candidate signal and the second plurality of additional candidate signal values using a soft-decision demodulator; and
    estimating the digital information based on the computed LLR.

2. The method of claim 1, wherein each of the first and second plurality of additional candidate signal values comprises a number of additional candidate signal values that is greater than a number of bits in each candidate signal value.

3. The method of claim 1, wherein each of the first and second plurality of additional candidate signal values comprises a number of additional candidate signal values that is different for at least two of the plurality of signal streams.

4. The method of claim 1, wherein each of the first and second plurality of additional candidate signal values are selected such that for each signal bit there is at least one selected signal value where that bit is equal to 1 and at least one selected signal value where that bit is equal to 0.

5. The method of claim 1, wherein selecting the first and second plurality of additional candidate signal values comprises selecting a predetermined set of signal values based on the first candidate signal value and a desired number of candidate signal values.

6. The method of claim 5, further comprising a lookup table comprising an ordered list of additional candidate signal values associated with the first candidate signal value.

7. The method of claim 1, further comprising triangularizing a channel response matrix associated with the obtained signals based on a QR decomposition of the channel response matrix.

8. The method of claim 1, wherein selecting the first and second plurality of additional candidate signal values comprises selecting candidate signal values associated with constellation points adjacent to the respective first and second candidate signal value.

9. The method of claim 1, wherein selecting the first plurality of additional candidate signal values comprises:
    selecting one of a plurality of bits corresponding to the first candidate signal value of the first signal stream;
    flipping the selected bit of the plurality of bits to provide a first flipped bit; and
    deriving one of the first plurality of additional candidate signal values based on the first flipped bit.

10. The method of claim 9, wherein deriving one of the first plurality of additional candidate signal values based on the first flipped bit further comprises:
    identifying a constellation point closest to the first candidate signal value having the first flipped bit.

11. A system for reconstructing digital information in a multiple-input receiver from signals transmitted by a multiple-output transmitter, in a multiple-input multiple-output (MIMO) communications channel, the system comprising:
    a plurality of antennas that obtain a plurality of signal streams from a plurality of transmitted signals, wherein the plurality of signal streams includes a first signal stream and a second signal stream;
    a hard-decision demodulator that selects a first candidate signal value for the first signal stream and a second candidate signal value for the second signal stream;
    a demodulator that selects a first plurality of additional candidate signal values for the first signal stream based on the first candidate signal value and a second plurality of additional candidate signal values for the second signal stream based on the second candidate signal value;
    a soft-decision demodulator that computes a first and a second log-likelihood ratio (LLR) from the plurality of signal streams, wherein the first LLR is computed based on the first candidate signal and the first plurality of additional candidate signal values, and the second LLR is computed based on the second candidate signal and the second plurality of additional candidate signal values; and a decoder that estimates the digital information based on the computed LLR.

12. The system of claim 11, wherein each of the first and second plurality of additional candidate signal values comprises a number of additional candidate signal values that is greater than a number of bits in each candidate signal value.

13. The system of claim 11, wherein each of the first and second plurality of additional candidate signal values comprises a number of additional candidate signal values that is different for at least two of the plurality of signal streams.

14. The system of claim 11, wherein each of the first and second plurality of additional candidate signal values are selected such that for each signal bit there is at least one selected signal value where that bit is equal to 1 and at least one selected signal value where that bit is equal to 0.

15. The system of claim 11, wherein the demodulator that selects the first and second plurality of additional candidate signal values selects a predetermined set of signal values based on the first candidate signal value and a desired number of candidate signal values.

16. The system of claim 15, further comprising a lookup table comprising an ordered list of additional candidate signal values associated with the first candidate signal value.

17. The system of claim 11, further comprising a linear processor that triangularizes a channel response matrix associated with the obtained signals based on a QR decomposition of the channel response matrix.

18. The system of claim 11, wherein the demodulator that selects the first and second plurality of additional candidate signal values selects candidate signal values associated with constellation points adjacent to the respective first and second candidate signal value.

19. The system of claim 11, wherein the demodulator is further configured to:
- select one of a plurality of bits corresponding to the first candidate signal value of the first signal stream;
- flip the selected bit of the plurality of bits to provide a first flipped bit; and
- derive one of the first plurality of additional candidate signal values based on the first flipped bit.

20. The system of claim 19, wherein the demodulator is further configured to:
- identify a constellation point closest to the first candidate signal value having the first flipped bit.

* * * * *